United States Patent [19]

Douek et al.

[11] 4,039,705

[45] * Aug. 2, 1977

[54] ANAEROBIC PRESSURE SENSITIVE ADHESIVE STOCKS

[75] Inventors: Maurice Douek, Los Angeles; Gustav A. Schmidt, South Pasadena, both of Calif.; Bernard M. Malofsky, Bloomfield; Martin Hauser, West Hartford, both of Conn.

[73] Assignees: Avery International Corporation, San Marino, Calif.; Loctite Corporation, Newington, Conn. ; a part interest to each

[ * ] Notice: The portion of the term of this patent subsequent to Nov. 23, 1993, has been disclaimed.

[21] Appl. No.: 722,872

[22] Filed: Sept. 13, 1976

Related U.S. Application Data

[63] Continuation-in-part of Ser. No. 512,940, Oct. 7, 1974, Pat. No. 3,993,815.

[51] Int. Cl.$^2$ .................... B32B 27/26; B32B 27/30
[52] U.S. Cl. .................................. 428/40; 156/331; 156/332; 260/27 R; 260/859 R; 260/859 PV; 260/873; 260/899; 260/901; 423/510; 423/520; 428/138; 428/423; 428/483
[58] Field of Search ............... 428/40, 138, 483, 423; 156/331, 332; 260/899, 901, 873, 27; 423/510, 520

[56] References Cited

U.S. PATENT DOCUMENTS

| | | | |
|---|---|---|---|
| 3,300,547 | 1/1967 | Gorman | 260/886 |
| 3,425,988 | 2/1969 | Gorman | 260/31.2 N |
| 3,591,438 | 7/1971 | Toback et al. | 260/885 |
| 3,625,875 | 12/1971 | Fruenglass et al. | 260/338 UA |
| 3,632,386 | 1/1972 | Hurst | 428/40 |
| 3,639,500 | 2/1972 | Muny et al. | 428/40 |
| 3,658,624 | 4/1972 | Lees | 156/332 |

Primary Examiner—George F. Lesmes
Assistant Examiner—R. J. Roche
Attorney, Agent, or Firm—Christie, Parker & Hale

[57] ABSTRACT

There are provided curable anaerobic pressure sensitive adhesive stocks in the form of sheets and tapes in which the adhesive is contained between two differential release surfaces. This construction permits total pressure sensitive adhesive transfer to a substrate which is to be firmly secured to another substrate upon the exclusion of oxygen and initiation of cure of the anaerobic resin.

The compositions are those, based on the total weight of the composition, containing from about 4 to about 40 percent by weight of a first anaerobic resin having a viscosity up to about 1000 cps at 25° C from 0 to about 80 percent by weight of a second anaerobic resin having a viscosity greater than about 1000 cps at 25° C, from about 9 to 95 percent by weight of a thermoplastic resin system, from 0 to about 10 percent of a latent accelerator and about 0.1 to about 10 percent of a hydroperoxide catalyst, the composition having static shear at 0.25 in$^2$ at a load of 250 gram greater than 10 minutes, a Polyken tack of greater than 700 grams, a loop tack greater than 1.5 lbs/in$^2$ and a 180° peel greater than 2 lbs. An external primer may be provided to accelerate cure.

50 Claims, 4 Drawing Figures

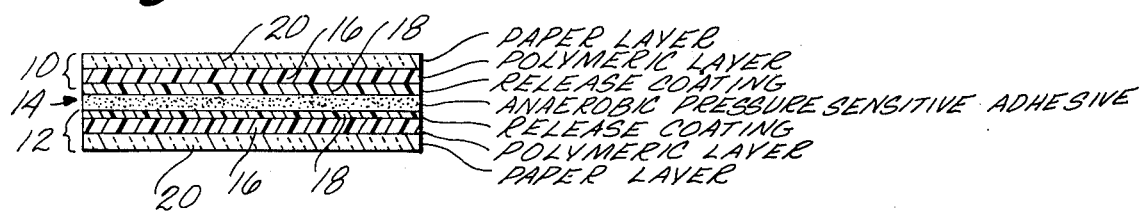

Fig. 1 — PAPER LAYER / POLYMERIC LAYER / RELEASE COATING / ANAEROBIC PRESSURE SENSITIVE ADHESIVE / RELEASE COATING / POLYMERIC LAYER / PAPER LAYER

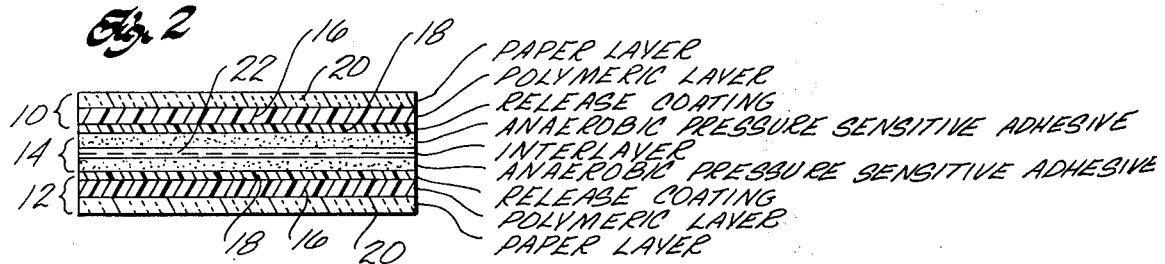

Fig. 2 — PAPER LAYER / POLYMERIC LAYER / RELEASE COATING / ANAEROBIC PRESSURE SENSITIVE ADHESIVE / INTERLAYER / ANAEROBIC PRESSURE SENSITIVE ADHESIVE / RELEASE COATING / POLYMERIC LAYER / PAPER LAYER

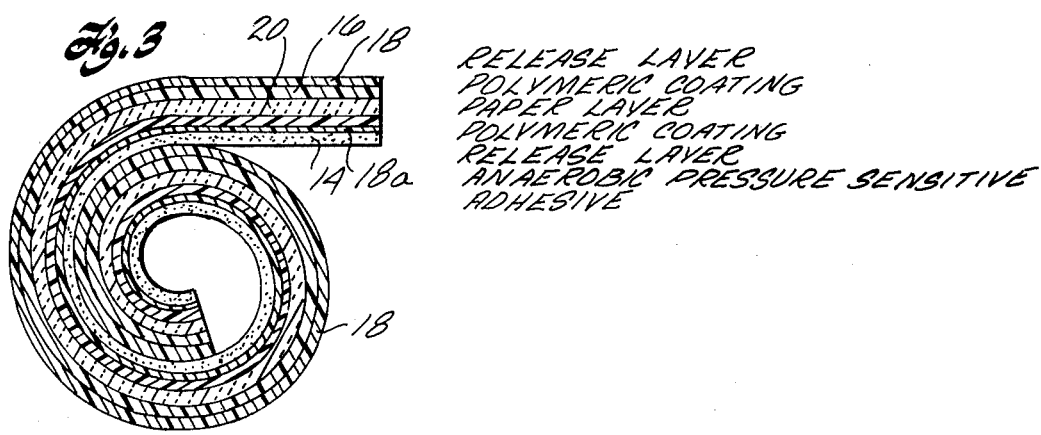

Fig. 3 — RELEASE LAYER / POLYMERIC COATING / PAPER LAYER / POLYMERIC COATING / RELEASE LAYER / ANAEROBIC PRESSURE SENSITIVE ADHESIVE

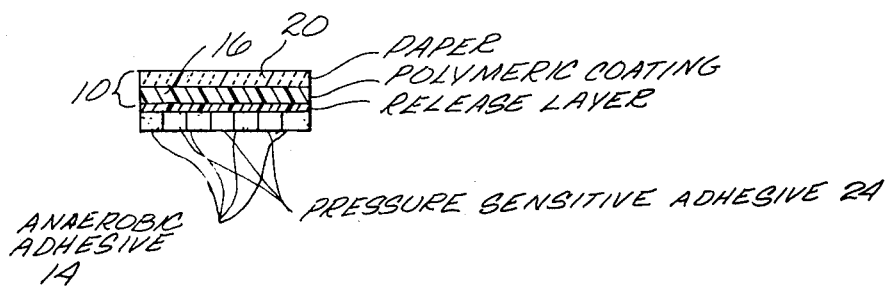

Fig. 4 — PAPER / POLYMERIC COATING / RELEASE LAYER / ANAEROBIC ADHESIVE 14 / PRESSURE SENSITIVE ADHESIVE 24

ANAEROBIC PRESSURE SENSITIVE ADHESIVE STOCKS

CROSS REFERENCE TO RELATED APPLICATION

This is a continuation-in-part of our application Ser. No. 512,940 filed Oct. 7, 1974, now U.S. Pat. No. 3,993,815.

BACKGROUND OF THE INVENTION

Anaerobic adhesive systems are those which are stable in the presence of oxygen, but will polymerize in the absence of oxygen. Polymerization is initiated by the presence of a peroxy compound. The cured cross-linked resins serve as sealants and as adhesives.

Typical resin monomers are terminated with polymerizable acrylate esters such as methacrylate, ethacrylate and chloroacrylate esters. The other ingredients typically present are an initiator, preferably an organic hydroperoxide such as cumene hydroperoxide, tertiary butyl hydroperoxide and the like. There is also normally provided a stabilizer against free radical intiation such as a qunione or hydroquinone, in an amount sufficient to prevent premature polymerization of the adhesive due to decomposition of the peroxy compound. There are also preferably present one or more accelerators which are typically organonitrogen compounds such as tertiary amines, imides, sulfonamides and the like which promote the rate of cure.

Cure will be accelerated by the presence of a suitable metal, such as a transition metal, or its ion.

An anaerobic adhesive is applid to one or both of the surfaces to be joined. When the two surfaces are joined and oxygen excluded, cure will be initiated. As is well known, surfaces such as glass may require application of a suitable accelerator such as a transition metal compound, which will increase the rate of cure upon the substantial exclusion of oxygen or air.

Anaerobic adhesives have been well published in the art as for instance, in U.S. Pat. Nos. 2,895,950; 3,041,322; 3,043,820; 3,046,262; 3,203,941; 3,218,305; 3,300,547; 3,435,012; 3,547,851 and 3,625,875.

Anaerobic adhesive systems are typically supplied from a water-like liquid to a light-weight grease in consistency. One end-use application is to apply the adhesive to the threads of a bolt or mating nut which are then assembled. The adhesive fills the spaces between the threads which excludes oxygen and enables cure. In the normal situation, the metals present in the bolt or the nut accelerate cure.

A problem exists, however, in fixturing other surfaces together with initiation and completion of cure, and in providing a controlled quantity of anaerobic monomer to the surfaces to be bonded.

SUMMARY OF THE INVENTION

According to the present invention, there are provided anaerobic pressure sensitive adhesive stocks such as sheets and tapes from which a pressure sensitive adhesive layer including at least one anaerobic resin system which can be completely transferred to one substrate to be bonded to another, and cured upon activation by a peroxy initiator and the exclusion of oxygen.

The anaerobic pressure sensitive adhesive stocks consist of a release liner or liners which provide differential release surfaces to permit separation of a pressure sensitive adhesive layer containing at least one anaerobic resin system from one release surface prior to separation of the layer from the other release surface.

In the situation where a tape construction is employed, the web provided by the tape can provide the differential release surfaces. In a typical situation, the surface of lowest release value is on the upper surface of a web, and the pressure sensitive adhesive retained by the undersurface of the tape such that, after applying the pressure sensitive adhesive to the substrate, the pressure sensitive adhesive will then fully release from the undersurface of the tape without cohesive failure of the adhesive layer.

In the instance of sheet construction, the lower release surface is provided by at least one of the sheets or webs.

The pressure sensitive adhesive layer comprises, based on the total weight of the components of the layer, from about 4 to about 40 percent by weight of the layer of a first anaerobic resin system containing at least one curable anaerobic resin having a viscosity from about 5 to about 1000 cps at 25° C and a vinyl equivalent number of from about 80 to about 2000; from 0 to about 80 percent by weight of the layer of a second anaerobic resin system containing at least one curable anaerobic resin having a viscosity greater than about 1000 cps at 25° C and including normally solid resins, at least one anaerobic resin contained in each of the anaerobic resin systems containing at least two polymerizable acrylic ester groups, each individually having the formula:

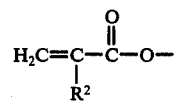

wherein $R^2$ is a radical selected from the group consisting of hydrogen, halogen and a lower alkyl containing from 1 to about 4 carbon atoms; from about 9 to about 95 percent by weight of the layer of a thermoplastic resin system containing at least one thermoplastic polymer selected from the group consisting of vinyl homopolymers, vinyl copolymers, polyurethanes, polyesters, polyamides, acrylic polymers, natural elastomers, synthetic elastomers which may and preferably does include a tackifier; from 0 to about 10 percent by weight of the layer of an organonitrogen compound and from 0.1 to about 10 percent by weight of the layer of a peroxy initiator preferably a hydroperoxide. The total amount of anaerobic resins present in the layer is from about 4 to about 90 percent by weight, preferably from about 35 to about 60 percent by weight based on the total weight of the layer. The layer when in a substantially solvent free state, has a static shear strength, at a 250 gram load per 0.25 in$^2$ of greater than about 10 minutes; a Polyken tack greater than about 700 grams; a loop tack greater than about 1.5 lbs. per in$^2$ and a 180° peel value greater than about 2 lbs., said composition being curable upon the substantial exclusion of oxygen. When cured the composition will provide a lap shear of at least 100 psi. When used in combination with a surface primer, fixturing, i.e. immobilization of the pressure sensitive adhesive layer will be realized within 24 hours.

The pressure sensitive adhesive layer may be homogeneous or heterogeneous in nature.

When heterogeneous, the anaerobic resin system may be separate from the pressure sensitive adhesive or combined in part with the pressure sensitive adhesive. As between the two, however, cohesive integrity is not disrupted during transfer.

As part of the construction, there may be included an interlayer, which may or may not have anaerobic properties but which will add flexural strength, particularly when lap constructions are required.

In the one construction, the webs to which the adhesive layer is applied may be impervious to the organonitrogen compounds which often serve as latent accelerators for the anaerobic resin system, as some have been found to migrate through a conventional paper base used in conventional pressure sensitive tape and sheet constructions. Loss of the accelerator may hinder the cure. To avoid this, organonitrogen compounds which have a low vapor pressure at ambient temperatures are preferably employed as accelerators.

To enhance rate of cure, the surfaces are normally primed with an active accelerator such as tetramethyl thiourea or the like.

In one embodiment, if the anaerobic pressure sensitive adhesive system contains free transition metal ions, then at least the peroxy initiator may be encapsulated in microspheres which, upon rupture, and upon the exclusion of oxygen, will initiate cure. In another embodiment, a suitable metal accelerator may be encapsulated.

If metals which act as accelerators are present and an encapsulation technique is not employed then the metals should be inactivated. This may be accomplished by scavenging each component of the system with a chelating agent, which may then be removed, if desired.

The thermoplastic polymers used in the preparation of the pressure sensitive anaerobic compositions of this invention are preferably of sufficient molecular weight so as to be elastomeric at room temperature. Further, they must be capable of being combined with the anaerobic resins and should not interfer with the creation of a crosslinked latticework of the anaerobic resins. In addition, the thermoplastic polymer must be selected such that the composition alone or with tackifiers and upon the inclusion of an initiator system will form, after evaporation of essentially all the solvent, a curable pressure sensitive adhesive layer or film of sufficient cohesive strength to be applied to a substrate from differential release surfaces without disruption of the layer or film. The fully formulated, solvent free anaerobic pressure sensitive adhesive should be elastomeric at room temperature.

Further, anaerobic pressure sensitive adhesive compositions should, when applied to a surface, wet the surface and conform to the intricacies of the surface so that a uniform bond will be created upon cure and that cure will extend throughout the layer of applied anaerobic pressure sensitive composition to maximize cohesive bond strength.

THE DRAWINGS

FIG. 1 illustrates one construction for a pressure sensitive anaerobic adhesive stock in sheet form.

FIG. 2 illustrates another construction for a pressure sensitive anaerobic adhesive stock in sheet form which includes an interlayer.

FIG. 3 illustrates a tape construction.

FIG. 4 illustrates a construction in which a provided adhesive system is heterogeneous.

DESCRIPTION

According to the present invention, there are provided anaerobic pressure sensitive adhesive stocks, such as sheets and self-wound tapes, from which an adhesive layer including an anaerobic resin system can be completely transferred to one substrate to be bonded to another and cured upon the exclusion of oxygen.

With reference to FIG. 1, the basic construction for sheets consists of a first web 10 providing a release surface 18, and a second web 12 providing a second release coating between which there is contained an anaerobic pressure sensitive adhesive layer 14. The webs provide differential release surfaces to permit preferential removal of one of the webs from the adhesive layer before removal of the other.

FIG. 3 illustrates a typical construction for a tape where the differential release liners 18 and 18a are contained on opposite sides of the web. Surface 18 has the highest release properties.

The pressure sensitive adhesive layer of the stock construction comprises, based on the total weight of the components of the layer from about 4 to about 40 percent by weight of a first anaerobic resin system containing at least one curable anaerobic resin having a viscosity from about 5 to about 1000 cps at 25° C and a vinyl equivalent number of from about 80 to about 2000 at 25° C and from 0 to about 80 percent by weight of the layer of a second anaerobic resin sysrem containing at least one curable anaerobic resin having a viscosity greater than 1000 cps at 25° C and including normally solid resins and wherein at least one anaerobic resin of each of the anaerobic resin systems contains at least two polymerizable acrylic ester groups, each individually having the formula:

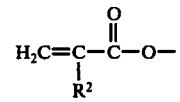

wherein $R^2$ is a radical selected from the group consisting of hydrogen, halogen and a lower alkyl containing from 1 to about 4 carbon atoms; from about 9 to about 95 percent by weight of the layer of a thermoplastic resin system, preferably including a tackifier; from 0 to about 10 percent by weight of the layer of an organonitrogen compound which serves as a latent accelerator and from 0.1 to about 10 percent by weight a peroxy initiator, preferably a hydroperoxide. The total amount of anaerobic resins present in the layer is from about 4 to about 90 percent by weight, preferably from about 35 to about 60 percent by weight based on the total weight of the layer.

The composition when in a substantially solvent free state, has a static shear strength for a 250 gram load per 0.25 in² of greater than about 10 minutes; a Polyken tack greater than about 700 grams, a loop tack greater than about 1.5 lbs. per in² and a 180° peel value greater than about 2 lbs such being measured at about 25° C, 1 atmosphere pressure and at a relative humidity of 50 ± 2%.

The composition is curable upon the substantial exclusion of oxygen. When cured the composition will provide a lap shear of at least 100 psi. When used in combination with a surface primer, fixturing, i.e. immobilization of the pressure sensitive adhesive layer will be realized within 24 hours.

The anaerobic resins useful in the practice of this invention are polymerizable di- and other polyacrylate esters since, because of their ability to form crosslinked polymers, they have more highly desirable adhesive properties. However, monoacrylate esters and/or amides can be included as diluent anaerobic resins. Examples of monomers of this type are hydroxyethyl methacrylate, cyanoethyl acrylate, t-butylaminoethyl methacrylate, glycidyl methacrylate, acrylamide, methacrylamide and the like. Anerobic properties are imparted to the acrylate ester monomers by combining with them a peroxy polymerization initiator as discussed more fully below.

One of the polyacrylate esters which can be used in the adhesives disclosed herein are polyacrylate esters which have the following general formula:

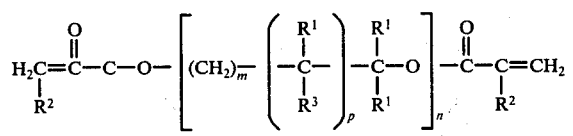
(1)

wherein $R^1$ represents a radical selected from the group consisting of hydrogen, lower alkyl of from 1 to about 4 carbon atoms, hydroxyn-alkyl of from 1 to about 4 carbon atoms, and the radical,

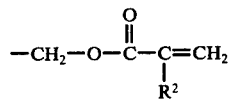
(2)

$R^2$ is a radical selected from the group consisting of hydrogen, halogen, and lower alkyl of from 1 to about 4 carbon atoms; $R^3$ is a radical selected from the group consisting of hydrogen, hydroxyl and

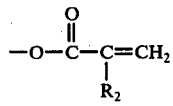
(3)

m is an integer equal to at least 1, e.g., from 1 to about 15 or higher, and preferably from 1 to about 8 inclusive; n is an integer equal to at least 1, e.g., 1 to about 20 or more; and p is one of the following: 0,1.

The polymerizable polyacrylate esters utilized in accordance with the invention and corresponding to the above general formula are exemplified by, but not restricted to the following materials: di-, tri- and tetraethylene glycol dimethacrylate, dipropylene glycol dimethacrylate, polyethylene glycol dimethacrylate, di (pentamethylene glycol) dimethacrylate, tetraethylene glycol diacrylate, tetraethylene glycol di (chloroacrylate), diglycerol diacrylate, diglycerol tetramethacrylate, tetramethylene dimethacrylate, ethylene dimethacrylate, neopentyl glycol diacrylate and trimethylol propane triacrylate.

Yet, another class of acrylate esters are those which are formed by the reaction of:
a. an acrylate ester containing an active hydrogen atom in the alcoholic moiety of the ester; with
b. an organic polyisocyanate.

Compositions including this general type of ester are disclosed in U.s. Pat. No. 3,425,988. Preferably, the active hydrogen is the hydrogen of a hydroxyl or a primary or secondary amine substituent on the alcoholic moiety of the ester, and the polyisocyanate is a diisocyanate. Naturally, an excess of the acrylate ester should be used to ensure that each isocyanate functional grou in the polyisocyanate is substituted.

The most preferred of the acrylate esters used in the manner described in the preceding paragraph are those in which the acrylate ester is a substituted alkyl or aryl acrylate ester, most preferably having the formula:

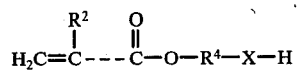

wherein X is —O— or

where $R^5$ is a hydrogen atom or a monovalent hydrocarbon radical containing up to 10 carbon atoms, and is preferably a hydrogen atom or an alkyl or aralkyl radical with from 1 to 10 carbon atoms; $R^2$ is as defined above; and $R^4$ is an alkylene radical with from 1 to 10 carbon atoms, or an aromatic diradical containing up to 14 carbon atoms, preferably phenylene, biphenylene or naphthylene.

Naturally $R^5$ and $R^4$ can contain any substituents or linkages which do not adversely affect the molecule for its intended use herein.

Typical polyisocyanates which can be reacted with the above acrylate esters to form polyacrylate monomers are toluene diisocyanate, 4,4'-diphenyl diisocyanate, dianisidine diisocyanate, cyclohexylene diisocyanate, 2-chloropropane diisocyanate, 4,4'-diphenylmethane diisocyanate, 2,2'-diethyl ether diisocyanate, 3-(dimethylamino)- pentane diisocyanate, tetrachlorophenylene diisocyanate-1,4 and trans-vinylene diisocyanate. Still other polyisocyanates that may be used are higher molecular weight polyisocyanates obtained by reacting an excess of any of the above described isocyanates with polyamines containing terminal, primary and secondary amine groups, or polyhydric alcohols, for example, the alkane and alkene polyols such as glycerol, 1,2,6-hexanetriol, 1,5-pentanediol, ethylene glycol, polyethylene glycol, 4,4'-dihydroxydiphenyldimethylmethane and condensation products of alkylene oxides with 4,4'-dihydroxydiphenyldimethylmethane.

Other acceptable monomers which can be used in the compositions according to the invention are acrylate terminated epoxy or ester units, i.e., reaction products of acrylic acid with hydroxy terminated ester or epoxy compounds, or low polymers thereof. Also contemplated by this invention are any other anaerobically curing monomers which, with their respective initiators, accelerators and stabilizers, i.e., inhibitors, are formulated according to the instant invention into a pressure sensitive anaerobic adhesive producing the advantageous properties of the stocks of the instant invention.

One of the anaerobic resins must have a viscosity less than about 5 to about 1000 cps as measured at 25° C and have a vinyl equivalent number of from about 80 to about 2000. The resins are normally liquids at one atmosphere and 25° C. Illustrative of such anaerobic resins there may be mentioned diethylene glycol dimethacrylate, diethylene glycol diacrylate, triethylene glycol dimethacrylate, triethylene glycol diacrylate, triethylene glycol dimethacrylate, triethylene glycol diacrylate, tetraethylene glycol dimethacrylate, tetraethylene glycol diacrylate, pentaethylene glycol dimethacrylate, pentaethylene glycol diacrylate, hexaethylene glycol demethacrylate, hexaethylene glycol diacrylate, pentaerythritol dimethacrylate, pentaerythritol triacrylate, epoxylated bisphenol A dimethacrylate (epoxylated 2,2 bis-(hydroxyphenyl) propane dimethacrylate) epoxylated bisphenol A diacrylate and the like as well as mixtures thereof.

The presently preferred anaerobic monomers having a viscosity greater than 1000 cps as measured at 25° C, include the reaction product of hydroxypropyl methacrylate with methylene-bis-phenyl-4,4'-diisocyanate; a polymer formed by methacrylate capping of a 1:1 adduct of toluene diisocyanate and hydrogenated 2,2-bis (4-hydroxyphenyl) propane as well as mixtures thereof.

There may also be present reactive monomers such as acrylic acid, methacrylic acid and the like which will cross-link with anaerobic monomers.

By the term "thermoplastic polymer system", as used herein, there is meant one or more high molecular weight thermoplastic polymers which, alone or in admixture, have a high enough average molecular weight in order that the resultant curable anaerobic pressure sensitive adhesive composition will have sufficient cohesive strength to be transferred from a conventional release surface to one substrate to be bonded to another substrate, alone, or in combination with a tackifier. Suitable average molecular weight will, of course, vary depending upon the type of thermoplastic polymer of polymer mixtures used, as well as upon the tackifier or tackifiers used, if any. Although it is desired that the polymers employed be compatible with the anaerobic resin system, they may be incompatible forming a heterogeneous system which remains pressure sensitive and transferrable in nature and capable of curing.

The word "combined" is used herein to indicate any workable combination, regardless of its physical form, of one or more thermoplastic polymers with one or more anaerobic monomers. Thus, a given combination may be a solution or otherwise and may be homogeneous or heterogeneous, provided only that it is useful in the pressure sensitive anaerobic stock of the invention.

Typical of the thermoplastic polymers which can be used are vinyl homopolymers and copolymers such as polyvinyl chloride, polyvinyl ethers, polyvinyl acetates, copolymers of vinyl pyrrolidone and the like; acrylic based polymers; polyurethanes; polyesters; polyamides; natural and synthetic elastomers and the like as well as mixtures thereof. The preferred thermoplastic polymers are copolymers of vinyl pyrrolidone, acrylic polymers and mixtures thereof.

As indicated, a tackifier may be employed to induce or enhance pressure sensitive properties. Typical tackifiers are rosins, rosin derivatives, terpenes, synthetic tackifying resins, low molecular weight polyacrylates and the like as well as mixtures thereof. The tackifiers employed in general have a molecular weight less than about 5,000, preferably below about 1,000.

By "catalyst system" there is meant an acid or based catalyzed system typically containing at least one peroxy initiator, preferably, although not necessarily, at least one accelerator which is preferably an organonitrogen compound and preferably, although not necessarily, at least one stabilizer against premature free radical polymerization for the anaerobic resin system.

Typical of the peroxy compounds which may be employed as initiators are the hydroperoxides, preferably organic hydroperoxides of the formula $R^6OOH$, wherein $R^6$ is generally a hydrocarbon radical containing up to about 18 carbon atoms, preferably an alkyl, aryl or aralkyl radical containing from 1 to about 12 carbon atoms. Typical examples are cumene hydroperoxide, methyl ethyl ketone hydrperoxide and the like.

As accelerators there may be mentioned liquid and solid organonitrogen compounds including but not limited to organic amides such as formamide, succinimide and the like; tertiary amines such as tributylamine, triethylamine, hexamethyl pararosaniline and the like; aromatic tertiary amines such as N,N'-dimethyl paratoluidene and the like; organic sulfimides such as benzoyl sulfimide (saccharin) and the like; as well as mixtures thereof. Organonitrogen compounds which have a low vapor pressure at ambient temperatures are particularly preferred as they have the least effect on the viscosity of the resulting composition as well as the least tendency to migrate from the composition.

Typical stabilizers are quinones, hydroquinones, and sterically hindered phenolic compounds.

By the term "anaerobic pressure sensitive adhesive", there is meant a mixture of the thermoplastic polymer system, anaerobic resin systems, catalyst and, if desired, an accelerator and/or a tackifier, which in an essentially solvent free state is permanently tacky at room temperature, and which firmly adheres to a variety of ordinary surfaces upon contact without the need of more than finger pressure. Further, it must conform to the surface irregularities of normal surfaces and have a sufficient shear modulus to resist removal subsequent to application to a surface.

Anaerobic resins containing a cure system are, as provided, normally liquid to grease-like in consistency and packaged in containers of a type where oxygen is provided to preclude premature gellation or cure. Molecular mobility is high and this aids stability.

When rendered less mobile as part of a pressure sensitive adhesive composition, factors change.

One has been found to be the loss of normally liquid accelerators due to diffusion of the accelerators to the surface of the adhesive layer, followed by evaporation. Another is deactivation due to peroxy initiator reaction with active metals or metal ions which may be contained in the paper normally used in release liner construction.

Accelerator loss by diffusion and evaporation can conveniently be controlled by employing accelerators having reduced vapor pressure, preferably an organonitrogen compound which is normally solid at room temperature. The preferred organonitrogen compound is saccharin.

Where the accelerator is normally a liquid, accelerator loss can also be controlled by providing an impervious or barrier layer to control diffusion of the accelerator.

This, as shown in FIG. 1, can be provided by thin barrier coats 16 coated with release surfaces 18, typically a silicone release agent bonded to backing papers 20.

If the barrier coat 16 is sufficiently thick so as to become a self-supporting film, then the backing papers 18 can be eliminated.

A convenient barrier coat or self-supporting film is polyethylene, particularly low density polyethylene, as low density polyethylene is normally prepared in the absence of a metal catalyst and does not contain a catalyst residue.

Other impervious polymers which are also free of available active metals or metal ions may also be employed.

Conventional or specially treated papers may be employed as the support web 18 for the release liners 10. In this instance, migration of the accelerator can be diminished or overcome by other routes.

One is to package the end product with impervious sheet construction enclosures such as polyethylene bags or wrappings.

Another is to provide additional accelerator to the adhesive composition employed such that while migration will occur, sufficient accelerator will remain in the adhesive composition to ensure cure of the anaerobic resin within normal time periods. The increased accelerator level should be accompanied by a corresponding increase in inhibitor level.

With reference now to FIG. 2, there may be included as part of the composite construction an interlayer 22 to improve flexural bond strength in structural adhesive applications.

One property which must exist in many structural adhesive applications if a high degree of torsional shear which is to a great extent unrelated to lap shear. Torsional or flexural resistance to failure may be important to many end use applications.

To provide increased torsional shear there may be provided an interlayer 22 which will combine with or be bonded to the provided pressure sensitive anaerobic resin system upon cure.

There can, for instance, be provided a self-supporting film such as a polyester, like Mylar™, which will, under curing conditions employed, establish a bond to the over and undercoated layers of pressure sensitive adhesive providing an anerobic resin system which will bond to the interlayer 22 and to the substrates to be joined to provide flexural strength to the joint.

As an alternative, there may be provided in the interlayer 22 an anaerobic resin which enhances the bond strengths upon cure while also improving torsional strength.

Yet another alternative is to provide a perforated web which may or may not be bonded to the anaerobic resin upon cure. In this instance, the perforations and the like become an integral part of the total cured polymer system to add desired flexural strength.

With reference now to FIG. 3, there is shown a configuration for a self-wound tape construction. All of the parameters set for the constructions described above apply.

Where a paper web 20 is used, it may, depending on packaging and service conditions, preferentially be dual coated with polymeric materials 16 upon which there is provided the differential release surfaces 18. In the alternative, there may be simply provided a single polymeric film 16 having applied differential release surfaces 18 and 18a.

In either event, it is preferred that the bond of the pressure sensitive layer including an anaerobic resin system have the lowest bond to release layer 18 as compared to release layer 18a to provide the most convenient transfer characteristics.

As indicated, with reference to FIGS. 1, 2, 3 and 4 the differential release surfaces 18 or 18 and 18a necessary for adhesive transfer can be provided by varying the nature of the release surface, typically a silicone release coating, or through their method of fabrication.

While nowise limiting, where common silicone release materials are employed, the adhesive compositions, independent of their ultimate configuration, are typically applied from solvent systems or by other suitable film casting techniques. By applying the adhesive to one release surface, a greater bond will be created between the adhesive layer and the release surface due to some interaction while the second release surface has a relatively weak physical bond to the provided pressure sensitive adhesive layer.

Pressure sensitive adhesive layers provided in accordance with the present invention may be applied by a variety of known means. In either event, the total layer is applied through a solvent system, whereas the second release coated layer is typically applied subsequent to solvent evaporation.

Another method for providing the differential release surfaces is to have the surface which is to be of lowest release value paper coated with a matte-finished polymeric layer, such as polyethylene, to which the release coating is applied followed by application of the adhesive layer. Because of interaction during solvent evaporation, the applied film becomes more strongly adherent to the release surface associated with the matte-finished polymer. The opposed release coating is applied to a smooth finished polyethylene or other polymeric coating. The bond only being physical, provides the required differential release surfaces.

With reference now to FIG. 4, there is provided yet another construction useful in accordance with the present invention. In that construction, there is employed a heterogeneous combination of a pressure sensitive adhesive 24 associated with an anaerobic adhesive 14 which may also be pressure sensitive in nature.

This is to meet the situation where there is required a bond between the surfaces to be bonded which is initially higher than that which can be provided by an anaerobic pressure sensitive adhesive prior to cure of the contained anaerobic resins.

Anaerobic resins do have a diluent effect on whatever polymer in which they are dissolved or otherwise combined. As a result, many conventional pressure sensitive adhesives have higher bond strength than can be achieved when combined with anaerobic resin.

To meet this need, there is contemplated the use of the heterogeneous combination in which a high bond strength pressure sensitive adhesive is employed to fixture two substrates together under high load or shear condition. There is also provided a viscoelastic anaerobic resin layer 14 which will not dilute the pressure sensitive adhesive and, upon cure, will provide the ultimate bond strength between the two surfaces. The viscoelastic anaerobic resin layer is of a nature that it has sufficient cohesive strength to preclude film splitting during transfer so that portions of the anaerobic resin will not remain with the release liner(s) during the adhesive transfer operation.

In this combination, the two systems provided may exist as alternate bars 24 and 14, as shown in FIG. 4, or as alternate dots or a heterogeneous system capable or laying down immiscible polymers by conventional manufacturing techniques.

What is also important in the heterogeneous combination is that the anaerobic adhesive layer, whether it be anaerobic alone or also pressure sensitive in nature, have sufficient integrity and viscosity per se or through the addition of fillers so as not to dilute the pressure sensitive adhesive.

In this combination there may be achieved high initial bond strength due to the presence of the undiluted pressure sensitive adhesive and high ultimate bond strength as a consequence of the subsequent cure of the anaerobic resin system. The configuration shown in FIG. 4 can be employed for the constructions shown in FIGS. 1 and 2 or for FIG. 3, upon the addition of another release layer (not shown) to the exposed side of paper layer 20.

Independent of the construction employed, care must be taken in preparing the tape and sheet construction to prevent premature cure or loss of activity during shelf life.

The anaerobic pressure sensitive adhesive compositions employed in the fabrication of sheets and tapes in accordance with this invention normally contain sufficient quantities of anaerobic resins in order that the thermoplastic polymer system employed will not interfere to any great degree with thorough and complete cross-linking or curing of the anaerobic resin system and to provide desired bond upon cure. The anaerobic pressure sensitive adhesive compositions may contain, based on a total weight of anaerobic resin system and the thermoplastic polymer system, and if present, tackifiers, from 4 to 90 percent by weight total anaerobic resins, preferably from about 35 to about 65 percent by weight. In small quantities, the anaerobic resin upon cure immobilizes the balance of the composition to prevent "creep" or "sag" although lap shear may be relatively low, e.g. 100 psi. At higher concentrations, high lap shear bonds in excess of 1000 psi may be easily realized.

For most applications, care should be taken in preparing the anaerobic pressure sensitive adhesives of this invention to cope with trace transition metal ions which may be present in each constituent of the composition including the anaerobic resin system and the thermoplastic polymer system, typically picked up from the vessels and systems used in their production.

If allowed to remain in the composition, the transition metal ions, while present in concentrations too low to complete cure, may, even at room temperature, consume a certain quantity of the peroxy initiator. As a result, sufficient tackiness may be retained so that pressure sensitive adhesive properties will not be destroyed, but the ability of the compositions to cure may diminish to a degree that ultimate bond strength will not be structural. That is, a cross-linked latticework will not develop throughout the applied pressure sensitive composition and cohesive failure may result. If necessary, this effect in the compositions of this invention may be controlled by means, such as chelation, known to the art. When accelerated cure is desired, however, transition metal compounds (e.g., copper salts) may advantageously be used as primers or activators external to the pressure sensitive anaerobic composition of the invention.

One way to cope with the metal ions is to scavenge them prior to or following their admixture in a mutually compatible solvent prior to casting of the pressure sensitive adhesive layer onto a release liner, which may also require scavenging.

Typical of the solvents which are employed for dissolving the constituents of the pressure sensitive compositions are nonpolar aliphatics, aromatics, alcohols, and the like which will not affect the peroxy compound. Ketones, for instance, should be avoided. Among the suitable solvents there may be mentioned toluene, isopropyl alcohol and mixtures thereof.

If the constituents of the pressure sensitive adhesive composition are properly scavenged, the active metals can be reintroduced, but in another form. Rather than being active in the composition, their effect may be rendered latent by encapsulating them in microspheres such that they will not be in contact with the peroxy initiator until the microspheres are ruptured upon the application of pressure to react with the peroxy compounds to accelerate cure.

An alternative route to prevent premature cure during shelf life or storage is to encapsulate the peroxy compound alone or with its accelerators. Then the active metals or metal ions can be left in the pressure sensitive adhesive composition without fear that premature cure or deactivation will occur.

With care being taken to isolate the peroxy compound of the catalyst system by encapsulation or the elimination or isolation of active metal or metal ions, the pressure sensitive adhesive ingredients can be cast into a film on release coated surfaces without fear that premature cure or deactivation will occur.

Coating weight of the cast pressure sensitive layers may be varied over a wide range with the general object of achieving surface wetting for a strong and tenacious bond. Typical coating weights are, after solvent evaporation, from about 20 to about 80 grams of net solids per square meter.

What is required is that the applied anaerobic pressure sensitive adhesive layer be removable from the release liner of maximum interfacial bond, typically a silicone coated liner, for transfer to a substrate without cohesive disruption of the anaerobic pressure sensitive adhesive layer. It is desirable for any given application to have the coating as thin as conveniently possible when the surface(s) to which the anaerobic pressure sensitive adhesive is applied provides the active metal accelerator. Cross-linking will then rapidly occur throughout the anaerobic resin and the surfaces will be bonded together. If the coating is too thick, longer cure times will be required or there would be formed an internal weakness which could result in cohesive failure of the partially cured resin.

As an alternative, by employing microencapsulated accelerators within the pressure sensitive adhesive composition, greater cure rates and complete cure can be realized. Surface priming with an active accelerator may also be employed alone or in combination with the latent organonitrogen compounds.

The surface primers are, in general, compounds containing either an

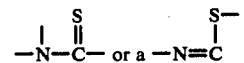

group. Many are disclosed, for instance, in U.S. Pat. No. 3,625,930 incorporated herein by reference. The preferred compounds are substituted thioureas have the general formula

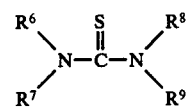

wherein $R^6$, $R^7$, $R^8$ and $R^9$ is individually a hydrocarbon group containing up to about 10 carbon atoms, preferably, alkyl, aryl or alkenyl and most preferably containing up to about 6 carbon atoms. Alternatively $R^6$ can be hydrogen. Illustrative compounds include tetramethyl thiourea, tetrethylthiourea, tetrabutyl thiourea, dimethyl diethyl thiourea trimethyl thiourea and the like. Tetramethyl thiourea is the preferred primer.

In substance, the total anaerobic pressure sensitive adhesive system acts as a binding agent for the anaerobic monomers until cure is complete and then the residual consituents only serve as fillers for the system. However, higher thermoplastic polymer system concentrations can also aid in improving flexural strength of the cured composition at some potential sacrifice in shear strength.

The types of products typically formed are the self-wound tapes, the surface of the supporting tape having differential release properties, sandwich constructions in which the anaerobic pressure sensitive adhesive composition is contained between two carrier liners having differential release surfaces, and similar products. All that is necessary is that the anerobic pressure sensitive adhesive layer be transferable to a substrate and completely separated from its carriers to leave only an anaerobic pressure sensitive adhesive in contact with the substrate to be bonded to another substrate.

In the following Examples, one or more of the following anaerobic resin systems were employed for the formulation of anaerobic pressure sensitive adhesive compositions.

Resin I

Approximately 75% of a reaction product of two moles of hydroxypropyl methacrylate with one mole of methylene-bis-phenyl-4,4'-diisocyanate and 25% triethylene glycol dimethacrylate.

Resin II

A polymer formed by hydroxypropyl methacrylate capping of a 1:1 adduct of toluene diisocyanate and hydrogenated 2,2-bis(4-hydroxyphenyl) propane.

The following test methods were employed in evaluating the pressure sensitive properties and properties of the cured end products. In determining pressure sensitive adhesive load bearing properties, the adhesive composition was cast on a suitable support such as paper or Mylar$^{TM}$.

Static Shear Strength-Federal Test Method Std. No. 147B, Method 20.1 (Load 250 grams 1.0.25 in$^2$) in minutes 180° Peel (dynamic-12 inches/min)-ASTM D-1000/68 in lbs.

Polyken Tack Test-ASTM D-2979-71, in grams

Loop Track — Tape and Lable Manufacturers Institute — in lb/in$^2$ — Modified by Using 8 inches × 1 inch Sample Vinyl equivalent numbers is the ratio of molecular weight to the number of ethylenically unsaturated bonds in the molecule.

Unless otherwise indicated all measurements set forth in the specification and the Examples were determined at one atmosphere pressure and 25° C. In determining physical properties of an adhesive layer relative humidity was 50 ±2%.

Except as otherwise stated the tackifier used in the Examples was Cellolyn $^{TM}$ 21-80H, an abiatic acid resin derivative manufactured and sold by Hercules Incorporated.

EXAMPLE 1

There was prepared a pressure sensitive adhesive composition of the formula shown in Table I.

Table I

| COMPONENT | % BY WEIGHT |
|---|---|
| Resin I | 40.50 |
| Resin II | 13.50 |
| Thermoplastic polyvinylpyrrolidone copolymer | 17.55 |
| Thermoplastic acrylic resin known as RA-1753, manufactured by Monsanto Chemical Company | 17.55 |
| Tackifier | 8.10 |
| Hydroquinone | 0.027 |
| Saccharin | 1.62 |
| Luperox$^{TM}$ (hydroperoxide) | 1.20 |

The ingredients were dissolved in a toluene-ethyl acetate blend as the solvent to a 55% by weight solids content and coated to a thickness of 3 mil on a first release linear having a first release surface. After solvent evaporation, there was applied a second release liner having a release surface of lower adhesion to the formed pressure sensitive adhesive layer. The curable anaerobic pressure sensitive adhesive layer of approximately 2 mils thickness had an initial static shear of 18 minutes at a 250 gram load per 0.25 square inch and a 180° peel value of 4.8 lbs/in. width. Polyken tack value was 850 grams and loop tack 3 lbs./in$^2$.

Clean, rolled steel plates measuring 1 inch × 3 inches were surface coated with tetramethyl thiourea as the primer accelerator. The pressure sensitive adhesive was transferred to one plate and the other applied in overlapping relationship. Overlap was about 2 inches. Fixturing time was 18 minutes after 3.5 hours, the lap shear tensile strength was 1200 psi.

EXAMPLE II

There was prepared a base composition as shown in Table II.

Table II

| COMPONENT | % BY WEIGHT |
|---|---|
| Resin I | 41.67 |
| Resin II | 13.89 |
| Thermoplastic polyvinylpyrrolidone copolymer | 18.05 |
| Thermoplastic acrylic resin known as RA-1753 manufactured by Monsanto Chemical Company | 18.05 |
| Tackifier | 8.33 |

The above composition was catalyzed with varying amounts of Luperox$^{TM}$, hydroperoxide, as the contained initiator and saccharin, when used, as the contained accelerator. In each test the formulated pressure sensitive adhesive with the initiator and accelerator, to the extent present, was transferred to cold rolled steel plates (1010-1020), previously cleaned in perchloroethylene and then surface primed with tetramethyl thiourea as an additional accelerator and after adhesive lamination the plates secured to each other in overlapping relation. Initial securement was achieved by virtue of the pressure sensitive adhesive nature of the transferred film. The plates measured 0.5 by 3.5 inches. The overlap of plates was 0.5 × 1 inch. For the test, fixture time is the time required for one plate of the laminate to become immobile with respect to the other. The results are shown in Table III.

Table III

| Test | Catalyst System, % by Weight[b] | | | Fixture Time | Lap Shear After 24 hrs. (psi) |
|---|---|---|---|---|---|
| | Initiator | Accelerator | Total | min | psi |
| 1 | 0.1 | 0 | 0.1 | 120 | 320 |
| 2 | 0.2 | 0 | 0.2 | 65 | 555 |
| 3 | 0.3 | 0 | 0.3 | 39 | 740 |
| 4 | 0.4 | 0 | 0.4 | 19 | 565 |
| 5 | 0.5 | 0 | 0.5 | 30 | 495 |
| 6 | 0.1 | 0.1 | 0.2 | 55 | 550 |
| 7 | 0.3 | 0.1 | 0.4 | 37 | 825 |
| 8 | 0.4 | 0.1 | 0.5 | 22 | 735 |
| Control | 0 | 0 | 0 | — | ~50 |

[b]Based on total dry weight of anaerobic resins, thermoplastic resins and tackifier.

EXAMPLE III

Using a procedure comparable to that described in Example I there was prepared an anaerobic pressure sensitive adhesive composition as shown in Table IV.

Table IV

| COMPONENT | % BY WEIGHT |
|---|---|
| Resin I | 49.7 |
| Resin II | 17.9 |
| Thermoplastic acrylic resin known as RA-1753 manufactured by Monsanto Chemical Company | 26.5 |
| Tackifier | 2.6 |
| Saccharin | 2.0 |
| Luperox$^{TM}$ | 1.3 |

The composition cast into a film of approximately 2 mils in thickness and in a solvent free state displayed the physical properties shown in Table V.

Table V

| Static Shear | 10 minutes |
|---|---|
| 180° Peel | 5 lbs. |
| Polyken Tack | 1100 grams |
| Loop Tack | 3.5 lbs./in$^2$ |

EXAMPLE IV

There was prepared an anaerobic pressure sensitive adhesive composition as shown in Table VI.

Table VI

| COMPONENT | % BY WEIGHT |
|---|---|
| Epoxylated bisphenol A dimethacrylate | 35.0 |
| Thermoplastic polyvinylpyrrolidone copolymer | 30.5 |
| Thermoplastic acrylic resin known as RA-1753 manufactured by Monsanto Chemical Company | 30.5 |
| Saccharin | 2.8 |
| Luperox$^{TM}$ | 1.25 |
| Hydroquinone | 0.001 |

When cast to a film, of approximately 2 mil thickness, the essentially solvent free film had the physical properties shown in Table VII.

Table VII

| Static Shear | 180 minutes |
|---|---|
| 180° Peel | 2 lbs. |
| Polyken Tack | 725 grams |
| Loop Tack | 1.6 lbs./in$^2$ |

EXAMPLE V

There was prepared an anaerobic pressure sensitive adhesive of the composition shown in Table VIII.

Table VIII

| COMPONENT | % BY WEIGHT |
|---|---|
| Resin I | 40.5 |
| Resin II | 13.5 |
| Thermoplastic polyvinylpyrrolidone copolymer | 35.2 |
| Tackifier | 8.1 |
| Saccharin | 1.6 |
| Luperox$^{TM}$ | 1.1 |

When cast into a film of approximately 2 mils thickness the essentially solvent free film had the physical properties shown in Table IX.

Table IX

| Static Shear | 10 minutes |
|---|---|
| 180° Peel | 5 lbs. |
| Polyken Tack | 1000 grams |
| Loop Tack | 3 lbs./in$^2$ |

EXAMPLE VI

There was prepared an anaerobic pressure sensitive adhesive of the composition shown in Table X.

Table X

| COMPONENT | % BY WEIGHT |
|---|---|
| Triethylene glycol dimethacrylate | 9 |
| Thermoplastic polyvinylpyrrolidine copolymer | 34.4 |
| Thermoplastic acrylic resin known as RA-1753 manufactured by Monsanto Chemical Company | 34.4 |
| Tackifier | 15.8 |
| Saccharin | 3.2 |
| Luperox$^{TM}$ | 3.2 |

When cast into a film of approximately 2 mil thickness, the essentially solvent free film had the physical properties shown in Table XI.

Table XI

| Static Shear | 54 minutes |
|---|---|
| 180° Peel | 2 lbs. |
| Polyken Tack | 700 grams |
| Loop Tack | 2 lbs/in$^2$ |

Following the procedure of Example II, lap shear strength were determined prior to cure and following cure. Lap shear after 24 hours cure with use of the primer was 500% greater than the lap shear determined without cure of the contained anaerobic resin.

What is claimed is:

1. An anaerobic pressure sensitive adhesive stock comprising:
   a. a first release coating on a self-supporting release liner;
   b. a transferable and curable pressure sensitive adhesive layer having one surface in contact with said first release coating, said pressure sensitive adhesive layer comprising:
      i. from about 9 to about 95 percent by weight of the layer of a thermoplastic resin system containing at least one thermoplastic polymer selected from the group consisting of vinyl homopolymers, vinyl copolymers, polyurethanes, polyesters, polyamides, acrylic polymers, natural elastomers, and synthetic elastomers;
      ii. from about 4 to about 40 percent by weight of the layer of a first anaerobic resin system, containing at least one curable anaerobic resin having a viscosity from about 5 to about 1000 cps at 25° C and a vinyl equivalent number from about 80 to about 2000 and from 0 to about 80 percent by weight of the layer of a second anaerobic resin system containing at least one of a curable anaerobic resin having a viscosity greater than 1000 cps at 25° C, at least one anaerobic resin in the first and second anaerobic resin system containing at least two polymerizable acrylic ester groups, each individually having the formula:

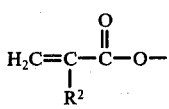

wherein R² is a radical selected from the group consisting of hydrogen, halogen and a lower alkyl containing from 1 to about 4 carbon atoms, the said anaerobic resins being present in an amount of from about 4 to about 90 percent by weight of the layer;

iii. from about 0.1 to about 10 percent by weight of the layer of a peroxy initiator to initiate cure of the contained anaerobic resins upon the substantial exclusion of oxygen; and iv. from 0 to about 10 percent by weight of the layer of an organonitrogen compound as a latent accelerator in the cure of the contained anaerobic resins, and said pressure sensitive adhesive layer providing a static shear strength of at least 10 minutes at a 250 gram load per 0.25 square inch, a 180° peel valve of at least about 2 pounds; a Polyken tack of at least about 700 gram and a loop tack of at least about 1.5 lbs. per in² prior to cure of said anaerobic resin system; and c. a second release coating on a self-supporting release liner in contact with the opposed surface of said transferable pressure sensitive adhesive layer, the bond of the first release coating to the transferable pressure sensitive adhesive layer being less than the cohesive strength of said pressure sensitive adhesive layer and exceeding the bond of said second release coating for said pressure sensitive adhesive layer to permit the pressure sensitive adhesive layer to be preferentially separated from said second release coating for application and bonding to a substrate prior to separation of the pressure sensitive adhesive layer from said first release coating without cohesive failure of said pressure sensitive adhesive layer.

2. An anaerobic pressure sensitive adhesive stock as claimed in claim 1 in which the anaerobic resin having a viscosity from about 5 to about 1000 cps at 25° C is selected from the group consisting of triethylene glycol dimethacrylate, epoxylated 2,2-bis (4-hydroxyphenyl) propane dimethacrylate, and mixtures thereof.

3. An anaerobic pressure sensitive adhesive stock as claimed in claim 2 in which the anaerobic resin having a viscosity greater than about 1000 cps at 25° C is selected from the group consisting of a reaction product of two moles of hydroxypropyl methacrylate and one mole of methylene-bis-phenyl-4,4'-diisocyanate, the polymer formed by hydroxypropyl methacrylate capping of a 1:1 adduct of toluene diisocyanate and hydroxylated 2,2-bis (4-hydroxyphenyl) propane.

4. An anaerobic pressure sensitive adhesive stock as claimed in claim 3 in which the vinyl copolymer is a copolymer containing vinylpyrrolidone.

5. An anaerobic pressure sensitive adhesive as claimed in claim 4 in which the organonitrogen compound is saccharin.

6. An anaerobic pressure sensitive adhesive stock as claimed in claim 1 in which the anaerobic resin having a viscosity greater than about 1000 cps at 25° C is selected from the group consisting of a reaction product of two moles of hydroxypropyl methacrylate and one mole of methylene-bis-phenyl-4,4'-diisocyanate, the polymer formed by hydroxypropyl methacrylate capping of a 1:1 adduct of toluene diisocyanate and hydroxylated 2,2-bis (4-hydroxyphenyl) propane.

7. An anaerobic pressure sensitive adhesive stock as claimed in claim 1 in which the vinyl copolymer is a copolymer containing vinylpyrrolidone.

8. An anaerobic pressure sensitive adhesive as claimed in claim 1 in which the organonitrogen compound is saccharin.

9. An anaerobic pressure sensitive adhesive stock as claimed in claim 1 in which the first release coating and the second release coatings are contained on opposed sides of a common release liner and the stock is formed into a roll, said second release coating being on the undersurface of said release liner.

10. An anaerobic pressure sensitive adhesive stock as claimed in claim 1 in which the first and second release coatings are contained on separate release liners.

11. An anaerobic pressure sensitive adhesive stock as claimed in claim 1 in which the pressure sensitive adhesive layer including the curable anaerobic resin system comprises a first pressure sensitive adhesive layer separated at least in part from a second pressure sensitive adhesive layer by an interlayer to which the two pressure sensitive adhesive layers are secured, said interlayer providing support for said first and second pressure sensitive adhesive layers.

12. An anaerobic pressure sensitive adhesive stock as claimed in claim 1 in which the pressure sensitive adhesive layer is heterogeneous and which includes pressure sensitive adhesive segments containing at least one of said thermoplastic polymers contiguous to viscoelastic anaerobic resin segments, said viscoelastic anaerobic resin segments having sufficient cohesive strength to prevent film splitting during transfer.

13. An anaerobic pressure sensitive adhesive stock as claimed in claim 1 in which the anaerobic resins are present in an amount of from about 35 to about 60 percent by weight based on the total weight of the layer.

14. An anaerobic pressure sensitive adhesive stock comprising:

a. a first release coating on a self-supporting release liner;

b. a transferable and curable pressure sensitive adhesive layer having one surface in contact with said first release coating, said pressure sensitive adhesive layer comprising:

i. from about 9 to about 95 percent by weight of the layer of a thermoplastic resin system containing at least one thermoplastic polymer selected from the group consisting of vinyl homopolymers, vinyl copolymers, polyurethanes, polyesters, polyamides, acrylic polymers, natural elastomers, and synthetic elastomers and including a tackifier;

ii. from about 4 to about 40 percent by weight of the layer of a first anaerobic resin system, containing at least one curable anaerobic resin having a viscosity from about 5 to about 1000 cps at 25° C and a vinyl equivalent number from about 80 to about 2000 and from 0 to about 80 percent by weight of the layer of a second anaerobic resin system containing at least one of a curable anaerobic resin having a viscosity greater than 1000 cps at 25° C, at least one anaerobic resin in the first and second anaerobic resin system containing at least two polymerizable acrylic ester groups, each individually having the formula:

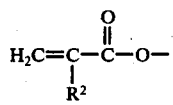

wherein R² is a radical selected from the group consisting of hydrogen, halogen and a lower alkyl containing from 1 to about 4 carbon atoms, the said anaerobic resins being present in an amount of from about 4 to about 90 percent by weight of the layer;
   iii. from about 0.1 to about 10 percent by weight of the layer of a peroxy initiator to initiate cure of the contained anaerobic resins upon the substantial exclusion of oxygen; and
   iv. from 0 to about 10 percent by weight of the layer of an organonitrogen compound as a latent accelerator in the cure of the contained anaerobic resins;
said pressure sensitive adhesive layer providing a static shear strength of at least 10 minutes at a 250 gram load per 0.25 square inch, a 180° peel value of at least about 2 pounds; a Polyken tack of at least about 700 gram and a loop tack of at least about 1.5 lbs. per in² prior to cure of said anaerobic resin system; and
   c. a second release coating on a self-supporting release liner in contact with the opposed surface of said transferable pressure sensitive adhesive layer, the bond of the first release coating to the transferable pressure sensitive adhesive layer being less than the cohesive strength of said pressure sensitive adhesive layer and exceeding the bond of said second release coating for said pressure sensitive adhesive layer to permit the pressure sensitive adhesive layer including the thermoplastic polymer system, the anaerobic resin system, and the catalyst system to be preferentially separated from said second release coating for application and bonding to a substrate prior to separation of the pressure sensitive adhesive layer from said first release coating without cohesive failure of said pressure sensitive adhesive layer.

15. An anaerobic pressure sensitive adhesive stock as claimed in claim 14 in which the anaerobic resin having a viscosity from about 5 to about 1000 cps at 25° C is selected from the group consisting of triethylene glycol dimethacrylate, epoxylated 2,2-bis (4-hydroxyphenyl) propane dimethacrylate, and mixtures thereof.

16. An anaerobic pressure sensitive adhesive stock as claimed in claim 14 in which the anaerobic resin having a viscosity greater than about 1000 cps at 25° C is selected from the group consisting of a reaction product of two moles of hydroxypropyl methacrylate and one mole of methylene-bis-phenyl-4,4'-diisocyanate, the polymer formed by hydroxypropyl methacrylate capping of a 1:1 adduct of toluene diisocyanate and hydroxylated 2,2-bis (4-hydroxyphenyl) propane.

17. An anerobic pressure sensitive adhesive stock as claimed in claim 14 in which the anaerobic resin having a viscosity greater than about 1000 cps at 25° C is selected from the group consisting of a reaction product of two moles of hydroxypropyl methacrylate and one mole of methylene-bis-phenyl-4,4'-diisocyanate, the polymer formed by hydroxypropyl methacrylate capping of a 1:1 adduct of toluene diisocyanate and hydroxylated 2,2-bis (4-hydroxyphenyl) propane.

18. An anaerobic pressure sensitive adhesive stock as claimed in claim 17 in which the vinyl copolymer is a copolymer containing vinylpyrrolidone.

19. An anaerobic pressure sensitive adhesive as claimed in claim 18 in which the organonitrogen compound is saccharin.

20. An anaerobic pressure sensitive adhesive stock as claimed in claim 14 in which the first and second release coatings are contained on separate release liners.

21. An anaerobic pressure sensitive adhesive stock as claimed in claim 14 in which the vinyl copolymer is a copolymer containing vinylpyrrolidone.

22. An anaerobic pressure sensitive adhesive as claimed in claim 14 in which the organonitrogen compound is saccharin.

23. An anaerobic pressure sensitive adhesive stock as claimed in claim 14 in which the first release coating and the second release coatings are contained on opposed sides of a common release liner and the stock is formed into a roll, said second release coating being on the undersurface of said release liner.

24. An anaerobic pressure sensitive adhesive stock as claimed in claim 14 in which the pressure sensitive adhesive layer including the curable anaerobic resin system comprises a first pressure sensitive adhesive layer separated at least in part from a second pressure sensitive adhesive layer by an interlayer to which the two pressure sensitive adhesive layers are secured, said interlayer providing support for said first and second pressure sensitive adhesive layers.

25. An anaerobic pressure sensitive adhesive stock as claimed in claim 14 in which the pressure sensitive adhesive layer is heterogeneous and which includes pressure sensitive adhesive segments containing at least one of said thermoplastic polymers contiguous to viscoelastic anaerobic resin systems, said viscoelastic anaerobic resin segments having sufficient cohesive strength to prevent film splitting during transfer.

26. An anaerobic pressure sensitive adhesive stock as claimed in claim 14 in which the anaerobic resins are present in an amount of from about 35 to about 60 percent by weight based on the total weight of the layer.

27. An anaerobic pressure sensitive adhesive stock comprising:
   a. a first release coating on a self-supporting release liner;
   b. a transferable and curable pressure sensitive adhesive layer having one surface in contact with said first release coating, said pressure sensitive adhesive layer being a homogeneous mixture comprising:
     i. from about 9 to about 95 percent by weight of the layer of a thermoplastic resin system containing at least one thermoplastic polymer selected from the group consisting of vinyl homopolymers, vinyl copolymers, polyurethanes, polyesters, polyamides, acrylic polymers, natural elastomers, and synthetic elastomers;
     ii. from about 4 to about 40 percent by weight of the layer of a first anaerobic resin system, containing at least one curable anaerobic resin having a viscosity from about 5 to about 1000 cps at 25° C and a vinyl equivalent number from about 80 to about 2000 and from 0 to about 80 percent by weight of the layer of a second anaerobic resin system containing at least one of a curable anaerobic resin having a viscosity greater than 1000 cps at 25° C, at least one anaerobic resin in the first and second anaerobic resin system containing at least two polymerizable acrylic ester groups, each individually having the formula:

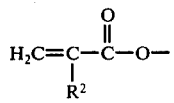

wherein R² is a radical selected from the group consisting of hydrogen, halogen and a lower alkyl containing from 1 to about 4 carbon atoms, the said anaerobic resins being present in an amount of from about 4 to about 90 percent by weight of the layer;

iii. from about 0.1 to about 10 percent by weight of the layer of a peroxy initiator to initiate cure of the contained anaerobic resins upon the substantial exclusion of oxygen; and iv. from 0 to about 10 percent by weight of the layer of an organonitrogen compound as a latent accelerator in the cure of the contained anaerobic resins;

said pressure sensitive adhesive layer providing a static shear strength of at least 10 minutes at a 250 gram load per 0.25 square inch, a 180° peel value of at least about 2 pounds; a Polyken tack of at least about 700 gram and a loop tack of at least about 1.5 lbs. per in² prior to cure of said anaerobic resin system; and c. a second release coating on a self-supporting release liner in contact with the opposed surface of said transferable pressure sensitive adhesive layer, the bond of the first release coating to the transferable pressure sensitive adhesive layer being less than the cohesive strength of said pressure sensitive adhesive layer and exceeding the bond of said second release coating for said pressure sensitive adhesive layer to permit the pressure sensitive adhesive layer to be preferentially separated from said second release coating for application and bonding to a substrate prior to separation of the pressure sensitive adhesive layer from said first release coating without cohesive failure of said pressure sensitive adhesive layer.

28. An anaerobic pressure sensitive adhesive stock as claimed in claim 27 in which the anaerobic resin having a viscosity from about 5 to about 1000 cps at 25° C is selected from the group consisting of triethylene glycol dimethacrylate, epoxylated 2,2-bis (4-hydroxyphenyl) propane dimethacrylate, and mixtures thereof.

29. An anaerobic pressure sensitive adhesive stock as claimed in claim 28 in which the anaerobic resin having a viscosity greater than about 1000 cps at 25° C is selected from the group consisting of a reaction product of two moles of hydroxypropyl methacrylate and one mole of methylene-bis-phenyl-4,4'-diisocyanate, the polymer formed by hydroxypropyl methacrylate capping of a 1:1 adduct of toluene diisocyanate and hydroxylated 2,2-bis (4-hydroxyphenyl) propane.

30. An anaerobic pressure sensitive adhesive stock as claimed in claim 29 in which the vinyl copolymer is a copolymer containing vinylpyrrolidone.

31. An anaerobic pressure sensitive adhesive as claimed in claim 30 in which the organonitrogen compound is saccharin.

32. An anaerobic pressure sensitive adhesive stock as claimed in claim 27 in which the anaerobic resin having a viscosity greater than about 1000 cps at 25° C is selected from the group consisting of a reaction product of two moles of hydroxypropyl methacrylate and one mole of methylene-bis-phenyl-4,4'-diisocyanate, the polymer formed by hydroxypropyl methacrylate capping of a 1:1 adduct of toluene diisocyanate and hydroxylated 2,2-bis (4-hydroxyphenyl) propane.

33. An anaerobic pressure sensitive adhesive stock as claimed in claim 27 in which the vinyl copolymer is a copolymer containing vinylpyrrolidone.

34. An anaerobic pressure sensitive adhesive as claimed in claim 27 in which the organonitrogen compound is saccharin.

35. An anaerobic pressure sensitive adhesive stock as claimed in claim 27 in which the first release coating and the second release coatings are contained on opposed sides of common release liner and the stock is formed into a roll, said second release coating being on the undersurface of said release liner.

36. An anaerobic pressure sensitive adhesive stock as claimed in claim 27 in which the first and second release coatings are contained on separate release liners.

37. An anaerobic pressure sensitive adhesive stock as claimed in claim 27 in which the pressure sensitive adhesive layer including the curable anaerobic resin system comprises a first pressure sensitive adhesive layer separated at least in part from a second pressure sensitive adhesive layer by an interlayer to which the two pressure sensitive adhesive layers are secured, said interlayer providing support for said first and second pressure sensitive adhesive layers.

38. An anaerobic pressure sensitive adhesive stock as claimed in claim 27 in which the anaerobic resins are present in an amount of from about 35 to about 60 percent by weight based on the total weight of the layer.

39. An anaerobic pressure sensitive adhesive stock comprising:

a. a first release coating on a self-supporting release liner;

b. a transferable and curable pressure sensitive adhesive layer having one surface in contact with said first release coating, said pressure sensitive adhesive layer beig a homogeneous mixture comprising:

i. from about 9 to about 95 percent by weight of the layer of a thermoplastic resin system containing at least one thermoplastic polymer selected from the group consisting of vinyl homopolymers, vinyl copolymers, polyurethanes, polyesters, polyamides, acrylic polymers, natural elastomers, and synthetic elastomers and including a tackifier;

ii. from about 4 to about 40 percent by weight of the layer of a first anaerobic resin system, containing at least one curable anaerobic resin having a viscosity from about 5 to about 1000 cps at 25° C and a vinyl equivalent number from about 80 to about 2000 and from 0 to about 80 percent by weight of the layer of a second anaerobic resin system containing at least one of a curable anaerobic resin having a viscosity greater than 1000 cps at 25° C, at least one anaerobic resin in the first and second anaerobic resin system containing at least two polymerizable acrylic ester groups, each individually having the formula:

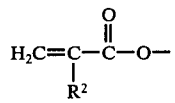

wherein R² is a radical selected from the group consisting of hydrogen, halogen and a lower alkyl containing from 1 to about 4 carbon atoms, the said anaerobic resins being present in an amount of from about 4 to about 90 percent by weight of the layer;

iii. from 0 to about 10 percent by weight of the layer of an organonitrogen compound as a latent accelerator in the cure of the contained anaerobic resins, and iv. from about 0.1 to about 10 percent by weight of the layer or a peroxy initiator to initiate cure of the contained anaerobic resins upon the substantial exclusion of oxygen;

said pressure sensitive adhesive layer providing a static shear strength of at least 10 minutes at a 250 gram load per 0.25 square inch, a 180° peel value of at least about 2 pounds; a Polyken tack of at least about 700 gram and a loop tack of at least about 1.5 lbs. per in² prior to cure of said anaerobic resin system; and c. a second release coating on a self-supporting release liner in contact with the opposed surface of said transferable pressure sensitive adhesive layer, the bond of the first release coating to the transferable pressure sensitive adhesive layer being less than the cohesive strength of said pressure sensitive adhesive layer and exceeding the bond of said second release coating for said pressure sensitive adhesive layer to permit the pressure sensitive adhesive layer to be preferentially separated from said second release coating for application and bonding to a substrate prior to separation of the pressure sensitive adhesive layer from said first release coating without cohesive failure of said pressure sensitive adhesive layer.

40. An anaerobic pressure sensitive adhesive stock as claimed in claim 39 in which the anaerobic resin having a viscosity from about 5 to about 1000 cps at 25° C is selected from the group consisting of triethylene glycol dimethacrylate, epoxylated 2,2-bis (4-hydroxyphenyl) propane dimethacrylate, and mixtures thereof.

41. An anaerobic pressure sensitive adhesive stock as claimed in claim 40 in which the vinyl copolymer is a copolymer containing vinylpyrrolidone.

42. An anaerobic pressure sensitive adhesive stock as claimed in claim 40 in which the anaerobic resin having a viscosity greater than about 1000 cps at 25° C is selected from the group consisting of a reaction product of two moles of hydroxypropyl methacrylate and one mole of methylene-bis-phenyl-4,4'-diisocyanate, the polymer formed by hydroxypropyl methacrylate capping of a 1:1 adduct of toluene diisocyanate and hydroxylated 2,2-bis (4-hydroxyphenyl) propane.

43. An anaerobic pressure sensitive adhesive as claimed in claim 42 in which the organonitrogen compound is saccharin.

44. An anaerobic pressure sensitive adhesive stock as claimed in claim 39 in which the anaerobic resin having a viscosity greater than about 1000 cps at 25° C is selected from the group consisting of a reaction product of two moles of hydroxypropyl methacrylate and one mole of methylene-bis-phenyl-4,4'-diisocyanate, the polymer formed by hydroxypropyl methacrylate capping of a 1:1 adduct of toluene diisocyanate and hydroxylated 2,2-bis (4-hydroxyphenyl) propane.

45. An anaerobic pressure sensitive adhesive stock as claimed in claim 39 in which the vinyl copolymer is a copolymer containing vinylpyrrolidine.

46. An anaerobic pressure sensitive adhesive as claimed in claim 39 in which the organonitrogen compound is saccharin.

47. An anaerobic pressure sensitive adhesive stock as claimed in claim 39 in which the first release coating and the second release coatings are contained on opposed sides of a common release liner and the stock is formed into a roll, said second release coating being on the undersurface of said release liner.

48. An anaerobic pressure sensitive adhesive stock as claimed in claim 39 in which the first and second release coatings are contained on separate release liners.

49. An anaerobic pressure sensitive adhesive stock as claimed in claim 39 in which the pressure sensitive adhesive layer including the curable anaerobic resin system comprises a first pressure sensitive adhesive layer separated at least in part from a second pressure sensitive adhesive layer by an interlayer to which the two pressure sensitive adhesive layers are secured, said interlayer providing support for said first and second pressure sensitive adhesive layer.

50. An anaerobic pressure sensitive adhesive stock as claimed in claim 39 in which the anaerobic resins are present in an amount of from about 35 to about 60 percent by weight based on the total weight of the layer.

* * * * *

UNITED STATES PATENT AND TRADEMARK OFFICE
CERTIFICATE OF CORRECTION

PATENT NO. : 4,039,705
DATED : August 2, 1977
INVENTOR(S) : MAURICE DOUEK, GUSTAV A. SCHMIDT, BERNARD M. MALOFSKY and MARTIN HAUSER It is certified that error appears in the above-identified patent and that said Letters Patent are hereby corrected as shown below:

Column 4, line 25, for "sysrem" read -- system --. Column 5, line 62, for "U.s." read -- U.S. --; line 68, for "grou" read -- group --. Column 10, line 17, for "for" read -- of --. Column 13, line 54, for "Track" read -- Tack --. Column 14, line 21, for "linear" read -- liner --. Column 22, line 48, for "beig" read -- being --. Column 24, line 24, for "vinylpyrrolidine" read -- vinylpyrrolidone --.

Signed and Sealed this

Twenty-third Day of May 1978

[SEAL]

Attest:

RUTH C. MASON
Attesting Officer

LUTRELLE F. PARKER
Acting Commissioner of Patents and Trademarks